(12) United States Patent
Kirkendall

(10) Patent No.: US 9,242,305 B2
(45) Date of Patent: Jan. 26, 2016

(54) CIRCULAR BURNER DEVICE FOR CUTTING TORCH

(71) Applicant: Aaron Kirkendall, Silsbee, TX (US)

(72) Inventor: Aaron Kirkendall, Silsbee, TX (US)

( * ) Notice: Subject to any disclaimer, the term of this patent is extended or adjusted under 35 U.S.C. 154(b) by 152 days.

(21) Appl. No.: 14/069,623

(22) Filed: Nov. 1, 2013

(65) Prior Publication Data

US 2015/0123324 A1    May 7, 2015

(51) Int. Cl.
*B23K 7/10*    (2006.01)

(52) U.S. Cl.
CPC ...................................... *B23K 7/107* (2013.01)

(58) Field of Classification Search
CPC ....................................................... B23K 7/107
USPC ..................................................... 266/48, 70
See application file for complete search history.

(56) References Cited

U.S. PATENT DOCUMENTS

| | | | | | |
|---|---|---|---|---|---|
| 2,524,098 | A | * | 10/1950 | Christenson | 33/27.03 |
| 3,713,635 | A | * | 1/1973 | Strnad | 266/71 |
| 6,022,506 | A | * | 2/2000 | Simmons | 266/54 |
| 2015/0123324 | A1 | * | 5/2015 | Kirkendall | 266/70 |

* cited by examiner

*Primary Examiner* — Scott Kastler
(74) *Attorney, Agent, or Firm* — The Law Office of Jerry D. Haynes

(57) ABSTRACT

A circular burner device comprising a cutting torch which includes a head, a tip, a valve, and a handle; a base bar which includes a first end and a second end; a U-shaped torch attachment at the first end of the base bar, where the U-shaped torch attachment receives the head of the cutting torch; a support bar fastened to the handle of the torch burner, where the support bar includes an opening along an entire length of the support bar; a slider at the second end of the base bar, where the slider includes a connection joint to attach to the second end of the support bar to the base bar; and a coupling fastening the support bar to the handle of the cutting torch, where the coupling slides within the opening in the support bar.

8 Claims, 1 Drawing Sheet

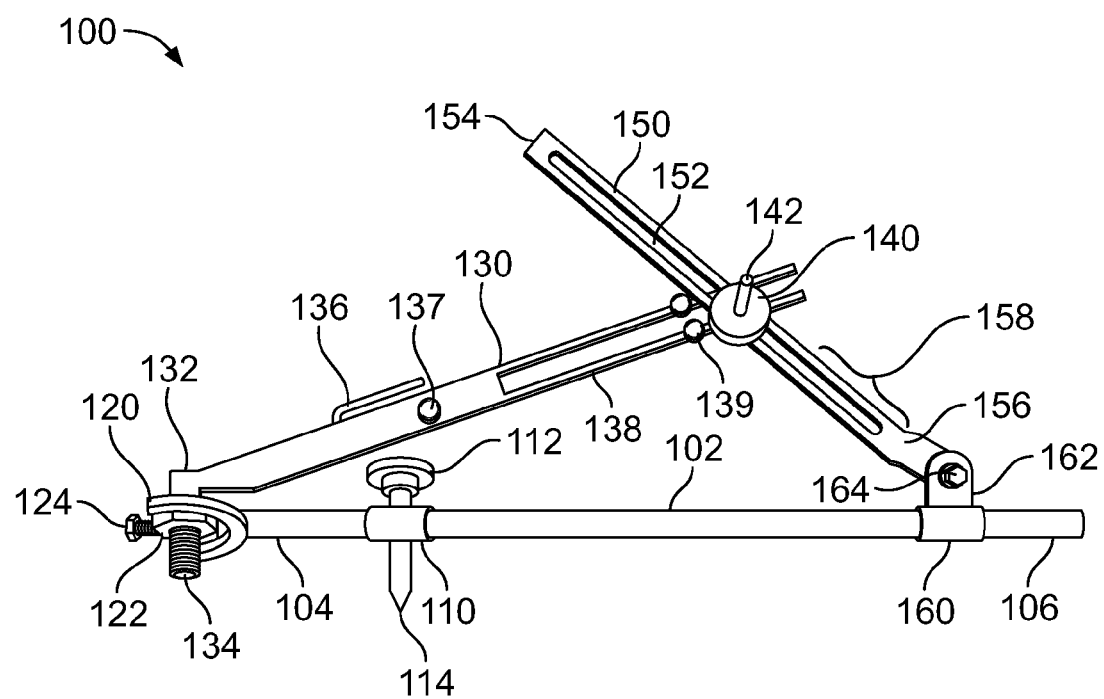

CIRCULAR BURNER DEVICE FOR CUTTING TORCH

BACKGROUND OF THE INVENTION

1. Field of the Invention

The present invention relates to a device to assists a user to simultaneously bevel and cut into a metal surface.

2. Description of Related Art

Most machinists and metal workers are proficient in how to use a cutting torch. The cutting torches utilize a concentrated flame to burn through a metal work piece. The most common torch is an oxy-acetylene torch which burns a mixture of oxygen and acetylene gasses to fuel the flame. The acetylene gas is the fuel to create the flame, while the oxygen gas creates the power to push the flame through the work piece. The cutting torch is a useful tool because of its fast and efficient way to cut through steel sheets, and metal pipes.

Typical cuts made into the metal surfaces are straight lines. To cut holes, especially ones with bevels, the machinists must add a metal sheet cutter. The two tools get the job done, but the process to use them takes up a considerable amount of time and effort as many steps are required to cut and bevel the metal. Moreover, conventional circle burners, allow cuts to be made at only one angle. Rounding and changing angles while metal cutting is difficult if not impossible with the current tools available on the market.

Therefore it would be beneficial in the art to provide a holder for a cutting torch that allows a user to easily change the angle of the cut during use. It would also be desirable in the art to provide a holder for a cutting torch that may be disassembled to enable use of the individual pieces when necessary.

SUMMARY OF THE INVENTION

In view of the foregoing disadvantages inherent in the prior art, the general purpose of the present invention is to provide a circular cutting device for a cutting torch, configured to include all of the advantages of the prior art, and to overcome the drawbacks inherent therein.

Accordingly, an object of the present invention is to provide a circular cutting device to hold a cutting torch and create beveled holes in a metal work piece.

To achieve the above objects, in an aspect of the present invention, a circular cutting device is described comprising a cutting torch which includes a head, a tip, a valve, and a handle; a base bar which includes a first end and a second end; a U-shaped torch attachment at the first end of the base bar, where the U-shaped torch attachment receives the head of the cutting torch; a support bar fastened to the handle of the torch burner, where the support bar includes an opening along an entire length of the support bar; a slider at the second end of the base bar, where the slider includes a connection joint to attach to the second end of the support bar to the base bar; and a coupling fastening the support bar to the handle of the cutting torch, where the coupling slides within the opening in the support bar.

These together with other aspects of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawing in which:

FIG. 1 depicts a perspective view of a circular burner device in accordance with an exemplary embodiment of the present invention.

DETAILED DESCRIPTION OF THE DRAWINGS

The present invention relates to a device to assists a user to simultaneously bevel and cut into a metal surface. The present invention provides a circular burner device to allow the user to cut circular holes in pipes and other metallic sheets, and to bevel the surface at the same time. The circular burner device includes an elongated bar with an attached support bar on a slider that holds a cutting torch. The elongated bar positions the head of the torch while the support bar adjusts the angle of the torch for cutting. With various adjustment possibilities the circular burner device reduces the effort and time required to create the unique cuts.

Turning now descriptively to the drawing, referring to FIG. 1, a perspective view of a circular burner device 100 is shown in accordance with an exemplary embodiment of the present invention. The circular burner device 100 includes an elongated base bar 102 with a first end 104 and a second end 106. The base bar 102 may be a square stock bar to provide secure attachments for additional fittings. Along the base bar 102, between the first end 104 and the second end 106, may be a pivot 110. The pivot 110 slides along the base bar 102 to adjust where the pivot braces against a work piece. The pivot 110 includes a rotating handle 112 and a point 114 where the rotating handle 112 rotates the base bar 102 about the point 114.

The circular burner device 100 supports a cutting torch 130, specifically an oxy-acetylene torch. The cutting torch 130 includes a head 132 from which a tip 134 extends. The cutting torch 130 includes an actuator lever 136 and a valve 137 to ignite and adjust the flame at the tip 134 of the torch 130. Behind the actuator lever 136 is a handle 138 to position and brace the cutting torch 130.

At the first end 104 of the base bar 102 may be a U-shaped torch attachment 120. The U-shaped torch attachment 120 includes a cradle 122 which receives the head 132 of the cutting torch 130. The head 132 is secured into the cradle 122 with a rotating nut 124. The rotating nut 124 tightens the head 132 within the cradle 122 to ensure that the tip 134 remains in place during use. The cradle 122 may include a spring to improve stability, so that as the cutting torch 130 cuts it follows the contour of the work piece.

Attached to the second end 106 of the base bar 102 is a support bar 150. The support bar 150 may be a flat bar with a central opening 152 which runs the entire length of the support bar 150. The support bar 150 includes a first end 154 and a second end 156. The first end 154 is closed and rounded. The second end 156 is attached to the base bar 102 with a slider 160. The slider 160 may include a connection joint 162 which enables the support bar 150 to pivot upon the base bar 102. The connection joint 162 includes a bolt 164 to lock the support bar 150 in place. Also, the bolt 164 enables the support bar 150 to detach from the slider 160 and therefore from the base bar 102. Likewise, the when the support bar 150 is disconnected from the connection joint 162 the slider 160 may completely slide off of the base bar 102.

To fasten the cutting torch 130 to the support bar 150 is a coupling 140. The coupling 140 is positioned at an end of the handle 138 of the cutting torch 130. The coupling 140 includes a gas port 142 where the oxygen and acetylene gas lines are attached to power the cutting torch 130. The coupling 140 slides within the opening 152 of the support bar 150 to adjust the angle at which the head 132 is directed. The handle 138 of the cutting torch 130 may include a set of washers 139 which secures the handle 138 to the coupling 140. Along the support bar 150 may be a plurality of markings 158 which identify measurement increments in inches and degrees. This way the angle of the tip 134 of the cutting torch 130 is accurately adjusted and positioned for use.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. A circular burner device comprising:
   a. a cutting torch, where the cutting torch includes a head, a tip, a valve, and a handle;
   b. a base bar, where the base bar includes a first end and a second end;
   c. a U-shaped torch attachment at the first end of the base bar, where the U-shaped torch attachment receives the head of the cutting torch;
   d. a support bar fastened to the handle of the torch burner, where the support bar includes a first end and a second end, and where the support bar includes an opening along an entire length of the support bar;
   e. a slider at the second end of the base bar, where the slider includes a connection joint to attach to the second end of the support bar to the base bar; and
   f. a coupling fastening the support bar to the handle of the cutting torch, where the coupling slides within the opening in the support bar, and where the coupling includes a gas port to power the cutting torch.

2. The circular burner device according to claim 1, where the U-shaped torch attachment includes a cradle to receive the head of the cutting torch.

3. The circular burner device according to claim 2, where the cradle includes a rotating nut to secure the head within the cradle.

4. The circular burner device according to claim 1, where the base bar includes a pivot, where pivot rotates the base bar to thereby reposition the head of the cutting torch.

5. The circular burner device according to claim 4, where the pivot includes a rotating handle to turn the base bar on a point of the pivot.

6. The circular burner device according to claim 1, where the support bar includes a plurality of markings, where the plurality of markings indicates increment measurements.

7. The circular burner device according to claim 1, where the increment measurements are in inches.

8. The circular burner device according to claim 1, where the increments measure degrees for an angle of the cutting torch.

\* \* \* \* \*